(12) United States Patent
Mintah et al.

(10) Patent No.: US 9,414,204 B2
(45) Date of Patent: Aug. 9, 2016

(54) FLEET COMMUNICATION NETWORK

(71) Applicant: Caterpillar Inc., Peoria, IL (US)

(72) Inventors: Brian Mintah, Washington, IL (US); Jeffrey J Schmidgall, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 728 days.

(21) Appl. No.: 13/710,966

(22) Filed: Dec. 11, 2012

(65) Prior Publication Data

US 2013/0102352 A1 Apr. 25, 2013

Related U.S. Application Data

(63) Continuation of application No. 12/391,911, filed on Feb. 24, 2009, now Pat. No. 8,364,189.

(51) Int. Cl.
| | | |
|---|---|---|
| H04B 7/00 | (2006.01) | |
| H04W 4/08 | (2009.01) | |
| H04L 12/715 | (2013.01) | |
| H04W 84/08 | (2009.01) | |
| H04W 40/30 | (2009.01) | |
| H04W 88/04 | (2009.01) | |

(52) U.S. Cl.
CPC ............... *H04W 4/08* (2013.01); *H04L 45/04* (2013.01); *H04W 84/08* (2013.01); *H04W 40/30* (2013.01); *H04W 88/04* (2013.01)

(58) Field of Classification Search
CPC ... H04L 51/04; H04L 65/4015; H04L 65/604; H04L 51/26; H04L 12/1831; H04L 12/581; H04L 2012/40273; G07C 9/00111; G07C 5/008; G08G 1/20; H04W 4/021; H04W 4/005; H04W 72/1247
USPC .......... 455/507, 517, 521, 456, 456.1, 404.2, 455/414.2, 457, 500, 430, 428, 445, 456.6; 701/50, 1, 9, 245, 23, 213; 370/310, 370/310.2
See application file for complete search history.

(56) References Cited

U.S. PATENT DOCUMENTS

| | | | |
|---|---|---|---|
| 4,986,384 A | | 1/1991 | Okamoto et al. |
| 5,315,515 A | | 5/1994 | Schmitz |
| 5,448,479 A | | 9/1995 | Kemner et al. |
| 5,961,560 A | | 10/1999 | Kemner |
| 6,037,901 A | * | 3/2000 | Devier et al. ............ 342/357.31 |
| 6,061,613 A | | 5/2000 | Zyburt et al. |
| 6,539,294 B1 | | 3/2003 | Kageyama |
| 6,778,097 B1 | | 8/2004 | Kajita et al. |
| 6,904,335 B2 | | 6/2005 | Solomon |
| 7,254,464 B1 | | 8/2007 | McLurkin et al. |
| 7,275,027 B2 | | 9/2007 | Sproule et al. |
| 7,280,494 B2 | | 10/2007 | Lagoutte |
| 7,398,137 B2 | * | 7/2008 | Ferguson et al. ............. 700/275 |
| 7,747,369 B2 | * | 6/2010 | Koehrsen et al. ............... 701/50 |
| 2005/0002354 A1 | * | 1/2005 | Kelly et al. .................... 370/329 |
| 2006/0184292 A1 | | 8/2006 | Appleby et al. |
| 2007/0038346 A1 | * | 2/2007 | Ehrlich et al. ................... 701/33 |
| 2007/0129869 A1 | | 6/2007 | Gudat et al. |
| 2007/0271002 A1 | | 11/2007 | Hoskinson et al. |

* cited by examiner

*Primary Examiner* — Jany Richardson
(74) *Attorney, Agent, or Firm* — Finnegan, Henderson, Farabow, Garrett & Dunner, LLP (57) ABSTRACT

A communication network for a fleet of vehicles is disclosed. The communication network has a first group of the fleet of vehicles having a first level of priority on the network and a second group of the fleet of vehicles having a second level of priority on the network. A first vehicle in the first group is assigned as a supervisor of a second vehicle in the second group.

20 Claims, 8 Drawing Sheets

| SOURCE ADDRESS | DESTINATION ADDRESS | DESTINATION NETWORK LEVEL | DESTINATION ID NUMBER | COMMAND | TIME-STAMP |
|---|---|---|---|---|---|
| ... | ... | ... | ... | ... | ... |

FLEET COMMUNICATION NETWORK

This is a continuation of U.S. application Ser. No. 12/391,911, filed Feb. 24, 2009, based on which this continuation claims priority under 35 U.S. C. §120.

TECHNICAL FIELD

The present disclosure relates generally to communication networks and, more particularly, to a fleet communication network.

BACKGROUND

Worksites, such as mines, landfills, quarries, excavation sites, etc., commonly have machines operating thereon to perform a variety of tasks. At a mining site, for example, a fleet of mining shovels and haul trucks may cooperate to remove material from various quarries and to transport the material to various dump sites. Communication networks have been provided to enable fleet communication on the worksite. A conventional worksite communication network includes a fleet of machines and a dispatch system which coordinates operations of the fleet to accomplish the task at hand. The fleet members may monitor their performance on the worksite, and may transmit performance data to the dispatch system. The dispatch system may, based on the performance data, monitor progress at the worksite and coordinate machine operations to efficiently accomplish the task. In addition, the fleet members may communicate with each other, such as to avoid collisions, to provide loading or dumping positioning information, or for other reasons.

Due to the nature of the worksite, however, it can be difficult to establish reliable communication networks. The movement of the fleet members, geographical obstacles, exposure to the elements, and other factors can degrade the integrity of signal transmissions. Accordingly, there is a need to provide reliable communication networks suitable for changing conditions on the worksite.

One such communication network is disclosed in U.S. Patent Application Publication No. 2005/0002354 by Kelly et al., published on Jan. 6, 2005 (the '354 publication). The '354 publication discloses an ad-hoc communication network whereby machines form sub-networks as they travel about the worksite and come within communication range of one another. Collectively, the sub-networks form an overall ad-hoc network that allows the machines to communicate with each other via intermediate nodes overlapped by two or more sub-networks.

While the communication network formed by the '354 publication may be advantageous because of its versatility, it may be unreliable in some ways. For example, a message transmitted on the network propagates from source to destination across the sub-networks, and between the sub-networks via the intermediate nodes. However, because the structure of the network continually changes with the movement of the machines, the path from a particular source to a particular destination may also continually change. Accordingly, traffic on the network is not structured or organized in any particular way to ensure reliability, because the network architecture is based entirely upon geographical location.

This disclosure is directed to overcoming one or more of the problems set forth above.

SUMMARY

One aspect is directed to a communication network for a fleet of vehicles. The communication network may include a first group of the fleet of vehicles having a first level of priority on the network and a second group of the fleet of vehicles having a second level of priority on the network. In addition, a first vehicle in the first group may be assigned as a supervisor of a second vehicle in the second group.

Another aspect is directed to a communication method for a network of a fleet of vehicles. The method may include assigning a first group of the fleet of vehicles to a first level of priority on the network, assigning a second group of the fleet of vehicles to a second level of priority on the network, and assigning a first vehicle in the first group as a supervisor of a second vehicle in the second group.

Yet another aspect is directed to another communication network for a fleet of vehicles. The communication network has an off-board system configured to transmit a message destined for a first vehicle in the fleet, a first group of the fleet of vehicles having a first level of priority on the network and including the first vehicle, and a second group of the fleet of vehicles having a second level of priority on the network and including a second vehicle assigned as a supervisor of the first vehicle. The vehicles in the fleet may be configured to receive the message from the off board system, determine whether the first vehicle is within direct communication range and, when the first vehicle is not within direct communication range, forward the message to the second vehicle.

DETAILED DESCRIPTION

Figure 1:
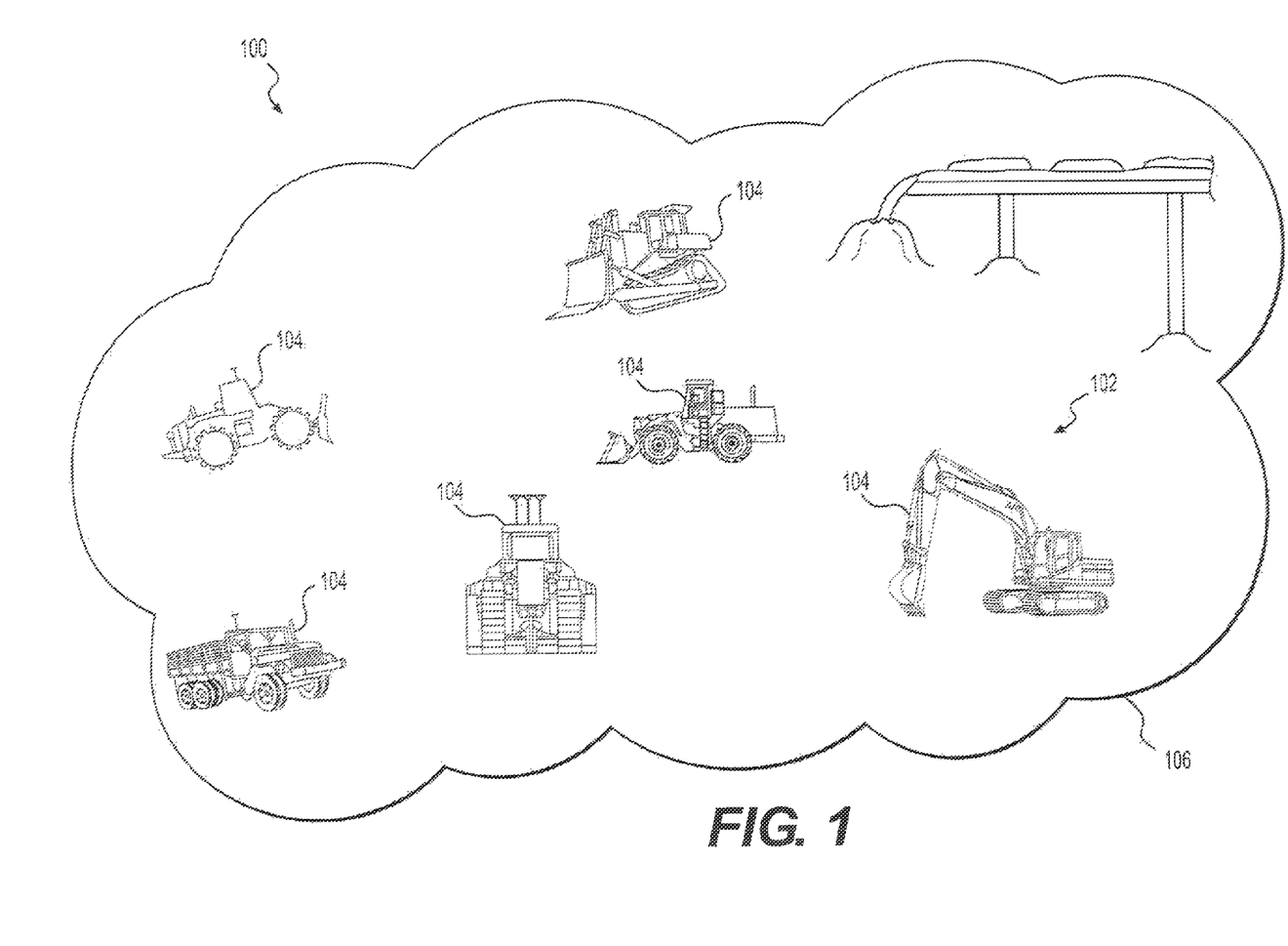
FIG. 1 is a representation of an exemplary environment in which a fleet of machines operates.

FIG. 1 illustrates an exemplary environment 100 in which the disclosed fleet communication network may be implemented. Environment 100 may represent, for example, a construction site, a quarry, an excavation site, a highway system, a war zone, or another environment in which a fleet 102 of machines 104 may cooperate to accomplish a task. Machines 104 may include, for example, haul trucks, excavators, dozers, loaders, graders, scrapers, passenger vehicles, battle vehicles, or other mobile machines which perform a task. Machines 104 may also include immobile machines, such as a power systems (e.g., generator sets) or offshore drilling platforms. In one example, environment 100 may be an excavation site upon which fleet 102 cooperates in earth-working operations. It is noted, however, that the examples listed above are intended to be non-limiting, as other suitable types of machines and environments are contemplated. Machines 104 may be manned or unmanned, and may be autonomous, semi-autonomous, or completely manually controlled. Fleet 102 may be interconnected via a communication network 106 to exchange information in connection with various tasks performed by fleet 102.

Figure 2:
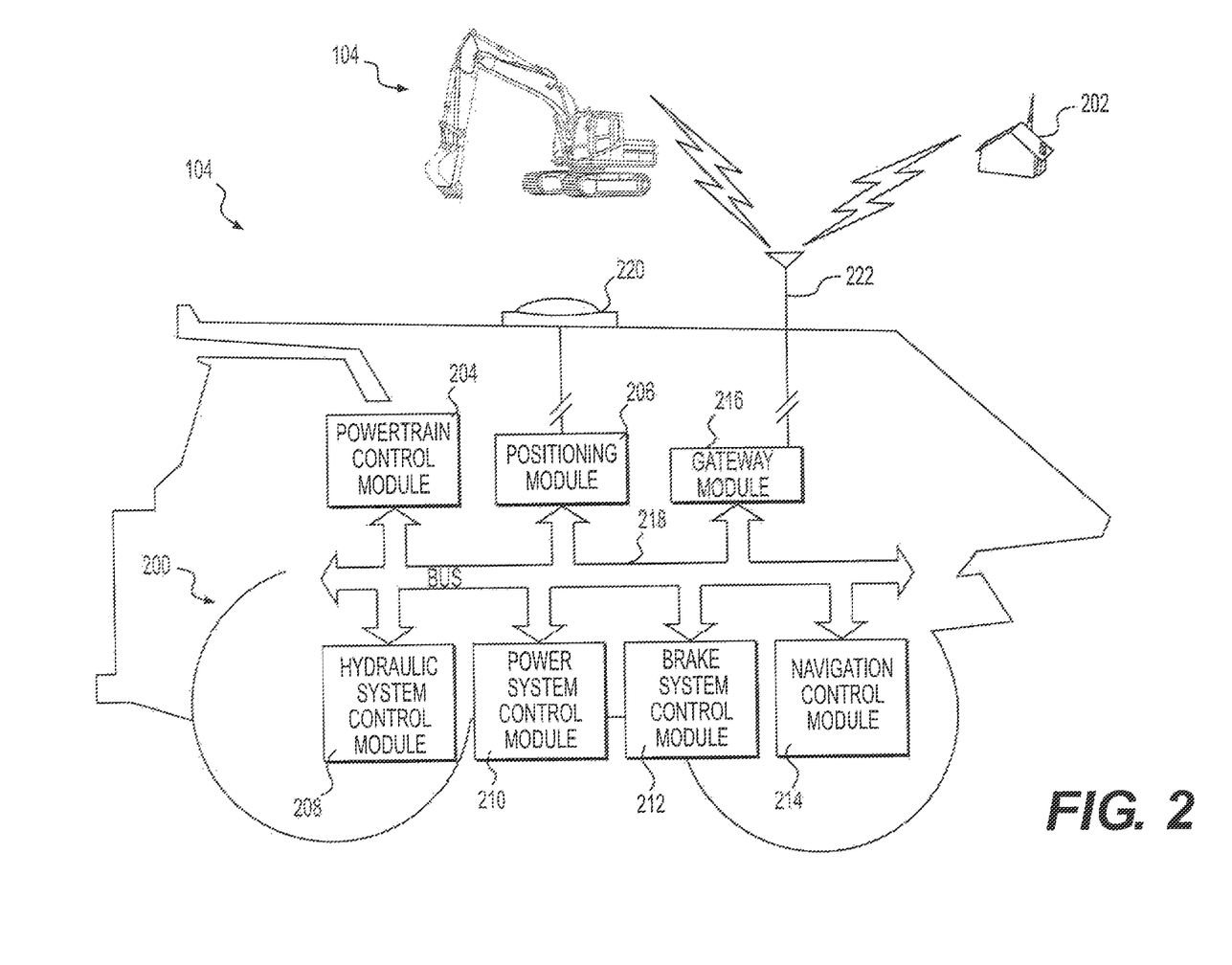
FIG. 2 is a representation of an exemplary machine operating in the environment of FIG. 1.

FIG. 2 illustrates an exemplary control system 200 onboard machine 104. Onboard system 200 may monitor or control functions of machine 104. For example, onboard system 104 may control and monitor mechanical or electrical systems onboard machine 104 in connection with autonomous control of machine 104. Onboard system 200 may also communicate with an off-board system 202 or with other fleet members to exchange information in connection with autonomous control of machine 104 or with other operations.

As shown by FIG. 2, onboard system 200 may include a power train control module 204, a positioning module 206, a hydraulic system control module 208, a power system control module 210, a brake system control module 212, a navigation control module 214, and a gateway module 216 interconnected on bus 218. It is noted that onboard system 200 may include other components than those listed above for performing different functions.

Power train control module 204 may be an electronic control unit which controls operations of a combustion engine (not shown) and a transmission (not shown) onboard machine 104. For example, based on signals from bus 218 (e.g., signals from other onboard modules) and on signals from various sensors, power train control module 204 may command the quantity of fuel injected into the combustion engine, ignition timing, valve timing, or other operations of the combustion engine. Power train control module 204 may also determine and command an appropriate gear for the transmission.

Positioning module 206 may be an electronic control unit which determines the position and orientation of machine 104. For example, positioning module 206 may be associated with a global positioning system (GPS) receiver 220 which receives signals from GPS satellites (not shown). Based on the received signals, positioning module 206 may determine a real-time position, speed, or velocity of machine 104. Alternatively or additionally, positioning module 206 may include an Inertial Reference Unit (IRU), an odometric or dead-reckoning device, a speed sensor, an accelerometer, a radio direction finder, or another device for determining the position and/or speed of machine 104. In addition, positioning module 206 may include a tilt sensor, an inclinometer, a gyrocompass, a radio direction finder, or another device for determining the pitch, roll, or yaw (i.e., orientation) of machine 104. Positioning module 206 may transmit on bus 218 signals indicative of the determined position, orientation, direction, speed, or velocity of machine 104.

Hydraulic system control module 208 may be an electronic control unit which controls a hydraulic system (not shown) onboard machine 104. For example, based on signals received from bus 218 and on signals from various sensors associated with the hydraulic system, hydraulic system control module 208 may generate control signals for various hydraulic valves to control the motion of an implement, such as a bucket, a dump bed, a ripper, or tool with which machine 104 may be equipped. Hydraulic system control module 208 may also control any other hydraulic systems onboard machine 104.

Power system control module 210 may be an electronic control unit which controls power distribution to various electronic systems onboard machine 104. For example, power system control module 210 may generate signals to control a generator-motor (not shown), a pump-motor (not shown), or another device to manage the storage and consumption of power onboard machine 104 (e.g., hybrid power management, auxiliary power management, etc.).

Brake control module 212 may be an electronic control unit which controls the application of the machine's brakes based on signals on bus 218, For example, brake control module 212 may transmit control signals to valves associated with a pressurized air or hydraulic brake system (not shown) onboard machine 104 to engage or disengage the machine's brakes.

Navigation control module 214 may control one or more of the other onboard modules 204-212 in connection with autonomous or semi-autonomous operation of machine 104. For example, navigation control module 214 may access a task plan stored in a memory (not shown) or received from off-board system 202. A task plan may include, for example, computer program instructions for causing machine 104 to perform various tasks. For example, a task plan for a dump truck may include repeating the steps of traveling to a first location to be loaded by an excavator with material, performing a handshake communication with the excavator when within communication range, receiving loading position information from the excavator, positioning itself with respect to the excavator for loading based on the received loading position information, sending a signal to the excavator when loading capacity has been reached, traveling to a second location, and dumping the ore at the second location. Accordingly, based on such a task plan, navigation control module 214 may send various command signals on bus 218 for execution by onboard modules 204-212.

It is to be appreciated that on-board system 200 may further include an operator interface module (not shown), which may receive input from an operator at the controls of machine 104. Based on the operator's input, the operator interface module may send various command signals on bus 218 for execution by onboard modules 204-214 Accordingly, machine 104 may be fully-autonomous, semi-autonomous, or controlled manually by an operator.

Figure 3:
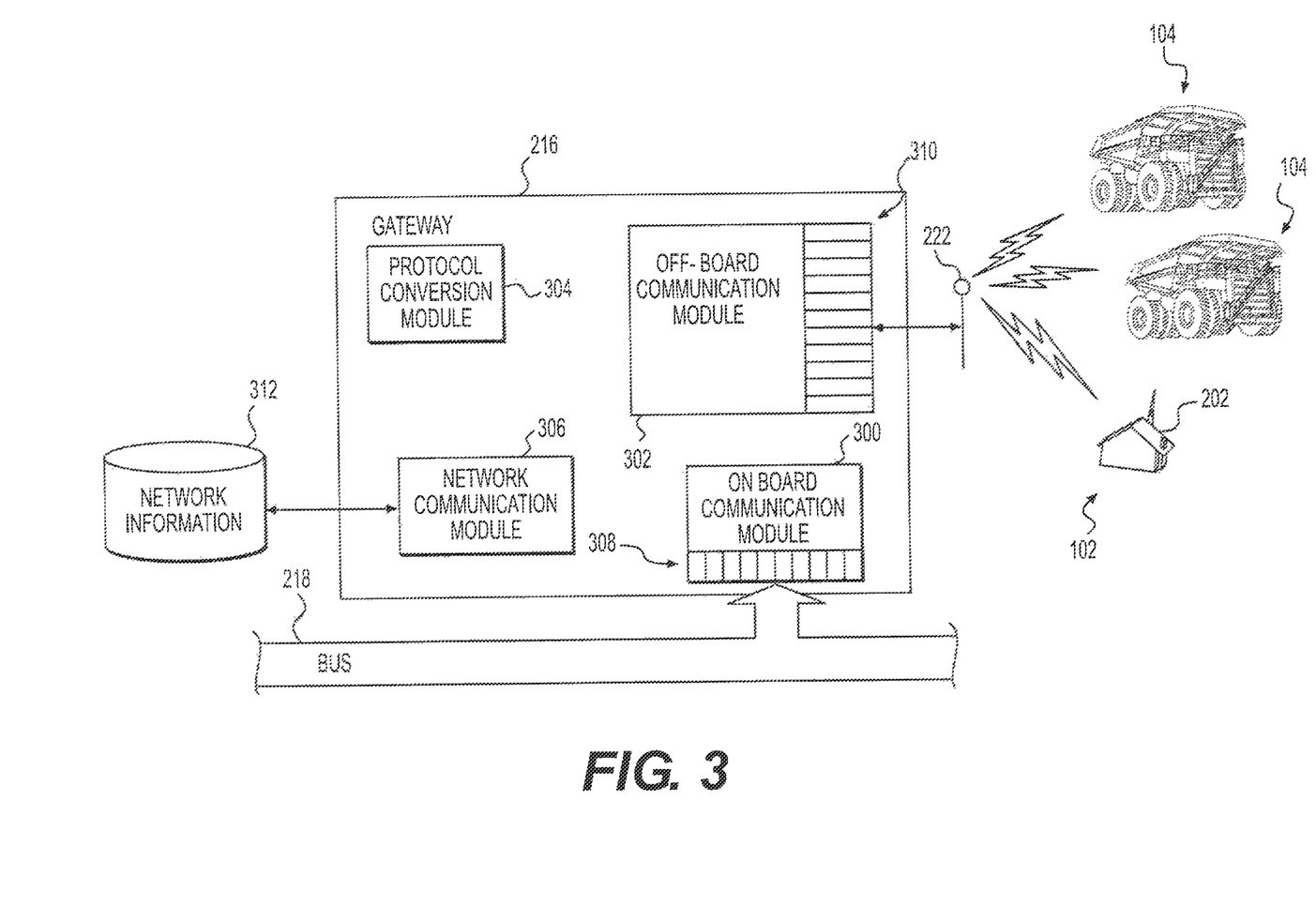
FIG. 3 is a representation of an exemplary disclosed gateway onboard the machine of FIG. 2.

Gateway 216 may be an electronic control module which provides a communication interface between onboard modules 204-214 and off-board system 202 and other fleet members. For example, gateway 216 may include communications hardware and software for leveraging a radio communication device 222 (e.g., an antenna) to transmit messages to, and to receive messages from, off-board system 202 and other fleet members. As shown by FIG. 3, gateway 216 may include an onboard communication module 300, an off-board communication module 302, a protocol conversion module 304, and a network communication module 306, among other things.

Onboard communication module 300 may interface with bus 218 to receive messages from, and provide messages to, onboard modules 204-214. For example, onboard communication module 300 may include an onboard data link port 308 for each of onboard modules 204-214. Messages sent to, or received from, an onboard module 204-214 may be transmitted to, or received from, bus 218 via a corresponding onboard data link port 308. Onboard data link ports 308 may include a controller area network (CAN) data link, a Society of Automotive Engineers (SAE) J1850 or J1939 data link, a Media Oriented Systems Transport (MOST) data link, an Ethernet data link, FlexRay™ data link, a Bluetooth™ data link, an RS-232 or -242 data link, or another suitable data link for communicating with onboard modules 204-214.

Off-board communication module 302 may be a communication interface between gateway 216 and off-board system 202 and other fleet members. Specifically, off-board communication module 302 may leverage off-board data link ports 310 to receive messages from, and provide messages to, off-board system 202 and other fleet members. Off-board data link ports 310 may include a controller area network (CAN)

data link, a wireless local area network (WLAN) data link, a wireless wide area network data link (WWAN), a radio data link, a satellite data link, or another suitable wireless data link for communicating with off-board system 202 and with other fleet members. In one aspect, each data link port 310 may provide a communication channel with a particular fleet member or with off-board system 202. For example, each data link port 310 and may be associated with a unique network address, such as Internet Protocol (IP) address, corresponding to a particular fleet member or to off-board system 202.

Protocol conversion module 304 may convert or translate messages from one protocol to another. Specifically, protocol conversion module 304 may convert onboard messages received from bus 218 to a format compatible for off-board communication, and vice versa. The protocol conversion may be based on the onboard data link port from which the message is received and on the off-board data link port through which the message must be forwarded to reach its destination, and vice versa. For example, protocol conversion module 304 may convert a message received from power train control module 204 from a format appropriate for onboard communication to a format appropriate for off-board communication to another fleet member or to off-board system 202. Similarly, protocol conversion module 304 may covert a message received from a fleet member or from off-board system 202 from a format appropriate for off-board communication to a format appropriate for onboard communication and processing by navigation control module 214.

Network communication module 306 may leverage onboard communication module 300, off-board communication module 302, protocol conversion module 304, and a network information database 312 to route messages received by gateway 216. Specifically, based on the source address and the destination address of a message, network communication module 306 may determine through which of onboard data link ports 308 or off-board data link ports 310 the message must be forwarded, and whether any processing by protocol conversion module 304 is necessary.

It is noted that onboard modules 204-216 may be implemented by hardware and/or by combinations of hardware and software. For example, onboard modules 204-216 may include software on an integrated circuit (IC), such as an application-specific integrated circuit (ASIC), a field-programmable gate array (FPGA), a flash module, or another suitable IC. Accordingly, onboard modules 204-216 may be embodied as a single IC (i.e., a controller) configured to perform all of the functions of onboard modules 204-216, or as multiple ICs each configured to perform different functions of onboard modules 204-216. Alternatively, onboard modules 204-216 may be implemented by way of a microprocessor executing software instructions for performing the functions of onboard modules 204-216. Onboard modules 204-216 may also include or otherwise be associated with any means for storing or processing information, such as a central processing unit (CPU), random access memory (RAM), read-only memory (ROM), a magnetic or optical storage device, or other computer-readable storage media. Onboard modules 204-216 may also be associated with power supply circuitry, signal-conditioning circuitry, solenoid driver circuitry, communication circuitry, or other appropriate circuitry.

Figure 4:
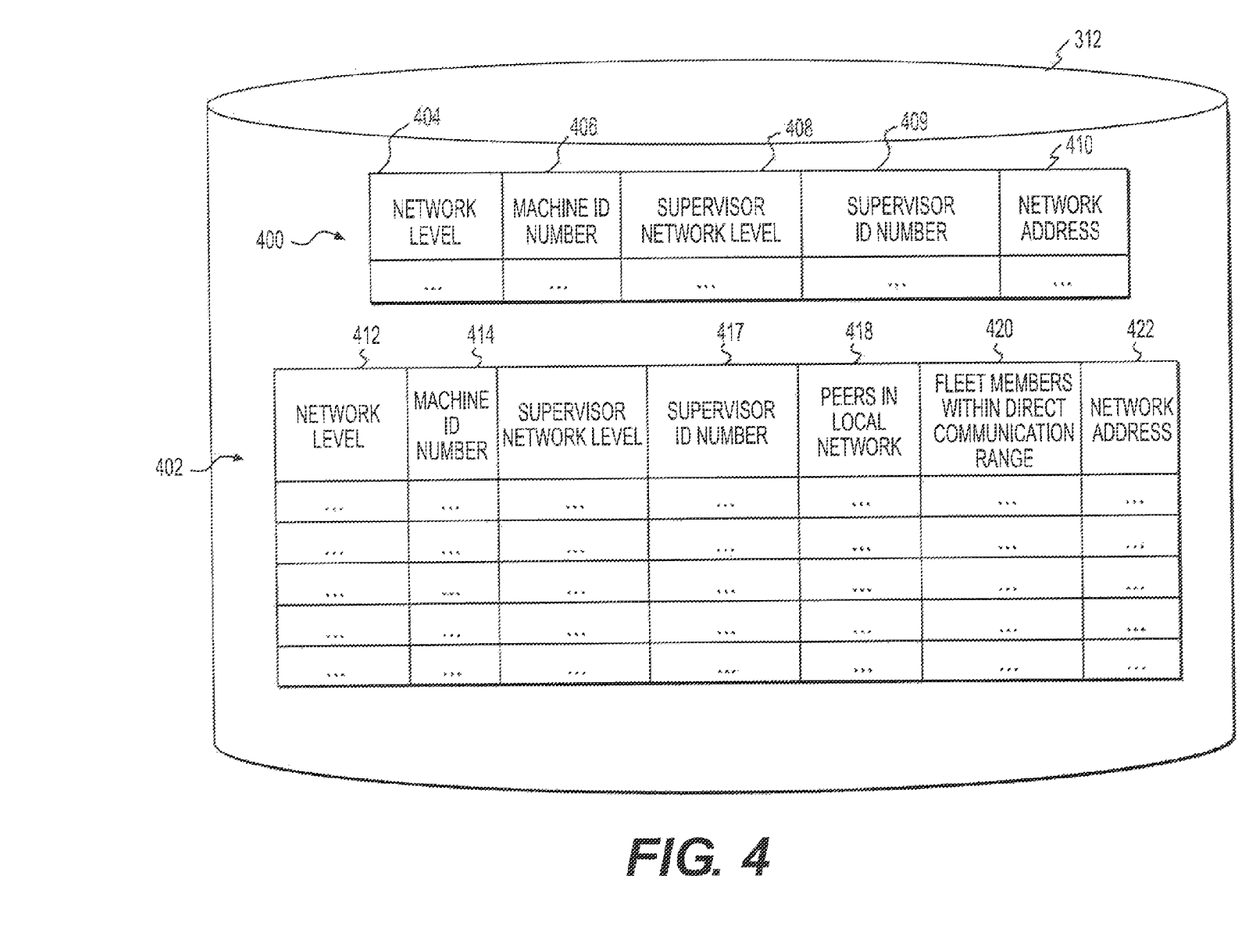
FIG. 4 is a representation of exemplary disclosed network information stored in memory of the machine of FIG. 2.

Network information database 312 may be, for example, a database stored in memory associated with gateway 216 and containing information about the structure of communication network 106. FIG. 4 shows a representation of network information database 312. As illustrated, network information database 312 may include, for example, a machine information table 400 and a network information table 402.

Machine information table 400 may contain information about communication network 106 and about the location of machine 104 on communication network 106. For example, machine information table 400 may indicate a network level 404 of machine 104, an identification number 406 of machine 104, a network level 408 of a supervisor of machine 104, an identification number 409 of the supervisor, and an address 410 of machine 104 on communication network 106 (e.g., an IP address). Fleet members and off-board system 202 may correspond to "nodes" in communication network 106.

According to one aspect, communication network 106 may be divided into tiers or levels of priority. As described in further detail below, these tiers or levels may be utilized when a destination machine is not within direct communication range, so that traffic on network 106 follows a structured pattern (rather than an arbitrary pattern). As a result, communication on network 106 may be made more reliable, and network resources can be conserved. A fleet member in a higher level may be responsible for transmitting, receiving, forwarding, or otherwise managing the communications of a fleet member in a lower level, as discussed below. Network level 404 may indicate to what level of communication network 106 machine 104 is assigned (e.g., level 3). In one example, level 1 may correspond to a higher level of priority of than level 2, level 2 may correspond to a higher level of priority than level 3, etc.

Machine identification number 406 may be a number or another ID assigned to machine 104 within the network level to which it is assigned. For example, level 2 of communication network may contain five fleet members, and machine 104 may be designated the third machine in the level (e.g., machine 3).

Supervisor network level 408 may indicate the network level to which the supervisor of machine 104 is assigned (e.g., level 1). Supervisor identification number 409 may be a number (or another ID) assigned to the supervisor of machine 104 within the network level to which it is assigned (e.g., machine 2). A "supervisor," as used herein, may be any fleet member in communication network 106 assigned to a network level directly above another fleet member for which it handles communications. A supervisor may be responsible for transmitting, receiving, forwarding, or otherwise managing communications of its supervisees when the supervisees or their destinations are not within direct communication range. For example, messages destined for machine 104 (or another fleet member) may be routed via the supervisor of machine 104. Likewise, a message from machine 104 (or another fleet member) destined for off-board system 202 may be routed through the supervisor of machine 104. In other words, a supervisor may act as a node through which communications involving its supervisees are channeled when the supervisees or their destinations are not within direct communication range. Accordingly, any fleet member in communication network 106 may be referenced by its network level 404, its machine identification number 406, and its supervisor's identification number 409.

Network information table 402 may contain information describing the manner in which communication network 106 is organized. As shown in FIG. 4, network information table 402 may contain a network level column 412, a machine identification number column 414, a supervisor network level column 416, a supervisor identification number column 417, a peers in local network column 418, a fleet members within direct communication range column 420, and a network address column 422. Network information table 402 may be a relational database or another data storage structure suitable for storing, searching, sorting, reading, or writing data in an organized fashion.

Network level column 412 may list the various priority levels within communication network 106 (e.g., levels 1-5). For example, network level column 412 may list all levels of communication network 106 to which at least one fleet member is assigned, it is to be appreciated that communication network 106 may include any number of levels, depending upon the particular implementation.

Machine identification number column 414 may list the numbers (or other IDs) of the fleet members within the network level to which they are assigned. It is to be appreciated that each network level may contain any amount of fleet members, depending upon the particular implementation. For example, level 1 may contain only machine 1, level 2 may contain machines 1-3, level 3 may contain machines 1-7, etc. Fleet members in the same network level may be considered "peers," as they may have the same degree of priority on communication network 106.

Supervisor network level column 416 may list the network levels to which the supervisors of the fleet members listed in columns 412 and 414 are assigned. Supervisor identification number column 417 may list the numbers (or other IDs) of the supervisors of the fleet members listed in columns 412 and 414 within the network levels to which they are assigned. For example, machine 1 in level 1 may be the supervisor of machines 1-3 in level 2, and machine 2 in level 2 may be the supervisor of machines 4-9 in level 3, etc.

Peers in local network column 418 may list identification numbers (or other IDs) of fleet members which share supervisors with corresponding fleet members listed in columns 412 and 414. For example, machines 1-4 in level 3 may all share as a supervisor machine 2 in level 2. Accordingly, machines 1-4 in level 3 may be listed in column 418 across from machine 2 in level 2 in columns 412 and 414. A supervisor and its respective supervisees may be considered a "local network" or a "local cell."

Fleet members within direct communication range column 420 may list information about other fleet members (or off-board system 202) that are within direct radio communication range of respective fleet members listed in columns 412 and 414. Specifically, column 420 may identify the network levels and numbers within the network levels of such fleet members. For example, machine 3 in level 3 may be in direct radio communication range of machine 2 in level 3, of machine 4 in level 2, and of off-board system 202. It is to be appreciated that information listed in column 420 may change as the fleet members travel about environment 100 and move in and out of direct radio communication range with each other or with off-board system 202. For example, fleet members may periodically broadcast a beacon, and any fleet member that receives the beacon may acknowledge receipt of the beacon. Each fleet member may then update its respective column 420 in network table 402 to indicate that the other fleet member is currently within direct communication range. The fleet members may also communicate upstream (i.e., to a supervisor) a message indicating that the status of communication network 106 has changed (i.e., that the two fleet members are now within direct communication range). Each fleet member that receives the message may forward it upstream until it reaches off-board system 202. Such status messages may similarly be communicated upstream to off-board system 202 in other situations, such as when a fleet member goes off-line. In response, off-board system 202 may broadcast a network status update message to fleet 102 containing information about the change in the structure of communication network 106 so that the fleet members may update their respective network information tables 402.

Off-board system 202 may be a computing system of a business entity associated with fleet 102, such as a contractor, a manufacturer, a dealer, a retailer, an owner, a service provider, or any other entity that sends, receives, or stores information associated with the operation of fleet 102. For example, off-board system 202 may belong to a worksite contractor or manager responsible for an excavation project taking place in environment 100. Off-board system 202 may include, for example, a laptop or desktop computer, a personal digital assistant, a mainframe, or another computing system known in the art. Off-board system 202 may include any means for monitoring, recording, storing, indexing, processing, and/or communicating information. Such means may include a central processing unit (CPU), random access memory (RAM), read-only memory (ROM), a magnetic or optical storage device, a display device, a user input device, a network communication device, or other computing devices known in the art. Off-board system 202 may include communications hardware and software for communicating wirelessly with fleet 102 (e.g., via radio). Accordingly, off-board system 202 may transmit messages to, and receive messages from, fleet 102 to coordinate activities taking place in environment 100.

Figure 5:
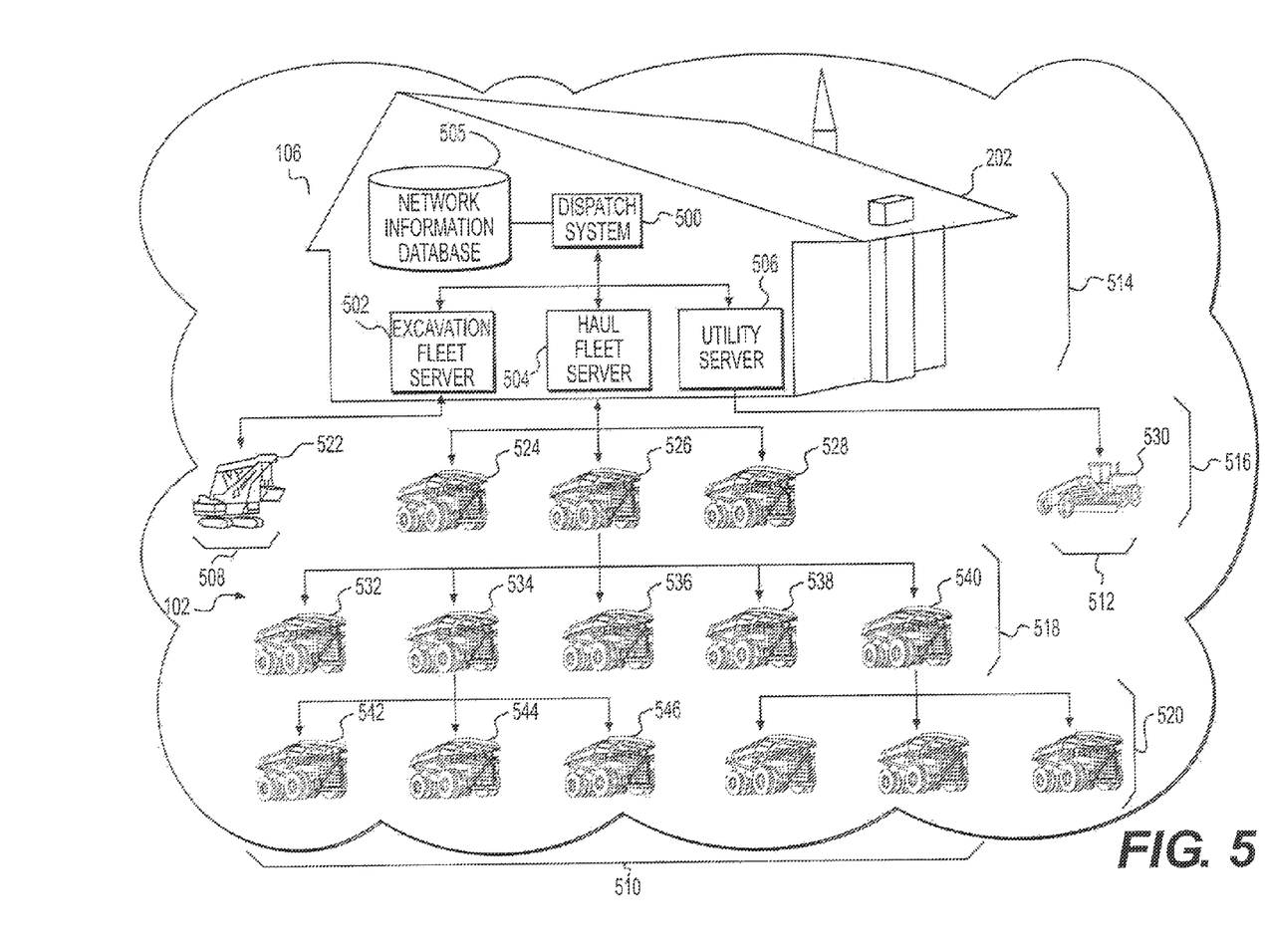
FIG. 5 is a representation of an exemplary disclosed communication network for the fleet of machines in FIG. 1.

As shown in FIG. 5, off-board system 202 may include a dispatch system 500 configured to leverage an excavation fleet server 502, a haul fleet server 504, and a utility fleet server 506. Dispatch system 500 may transmit messages to, and receive messages from, fleet members via excavation fleet server 502, haul fleet server 504, and utility fleet server 506 to coordinate fleet operations. In order to facilitate such communication, dispatch system 500 may include or otherwise be associated with a network information database 505, which may contain the same or similar information as that discussed above in connection with network information database 312 (FIG. 3). Depending upon the configuration of fleet 102, fleet operations may be autonomous, semiautonomous, or manual, and the fleet members may be manned or unmanned. For example, dispatch system 500 may automatically manage an excavation project according to a digital terrain map stored in memory and containing a description, in worksite coordinates, of desired worksite terrain.

Data gathered by fleet members during operation may be communicated via radio to dispatch system 500 for fleet coordination purposes. Such gathered data may include GPS positions, travel speeds and distances, payload values, fuel levels, engine speeds, scanned worksite terrain coordinates, waiting times, queuing times, loading times, round trip times, hauling times, status information (e.g., whether a fleet member is enabled/disabled, online/offline, loading/unloading, traveling, refueling, etc.), or other performance data valuable for coordinating fleet activities. Based on the gathered information, dispatch system 500 may monitor or log fleet operations taking place in environment 100, dispatch or recall fleet members (e.g., for scheduled maintenance or repairs), route fleet members to loading and unloading destinations, reroute fleet members based on waiting times at the destinations, provide or update tasks to be performed by fleet members, or perform other fleet management operations. In addition, dispatch system 500 may calculate and log worksite metrics, such as fleet member efficiencies, overall worksite progress, and other information useful for evaluating the performance of fleet 102.

As shown by FIG. 5, each of servers 502-504 may manage a different portion of fleet 102. For example, excavation fleet server 502 may relay messages between dispatch system 500 and excavating fleet members 508 (e.g., excavators, dozers, loaders, mining shovels, etc.). Haul fleet server 504 may relay messages between dispatch system 500 and hauling fleet members 510 (e.g., dump trucks or loaders). Utility fleet server 506 may relay messages between dispatch system 500 and utility fleet members 512 (e.g., scrapers, pavers, fork lifts, etc.). It is to be appreciated, however, that other configurations for off-board system 202 are possible depending upon the particular configuration of fleet 102. For example, a single fleet server may be responsible for all of fleet 102.

As shown in FIG. 5 and discussed above, communication network 106 may be hierarchical in nature. That is, communication network 106 may have multiple tiers or levels corresponding to different degrees of priority of fleet members contained therein. In the example shown in FIG. 5, communication network 106 includes first through fourth levels 514-520. It is noted, however, communication network 106 may include any suitable number of levels, depending upon the particular implementation. The hierarchical structure of network 106 may be used, when a destination node is not within direct radio communication range of a source node, to impose structure on traffic on network 106 and thereby increase the reliability of network 106 and reduce consumption of network resources, such as available bandwidth.

First level 514 may include off-board system 202, and may correspond to a "command" level having the highest degree of priority on communication network 106. Similarly, second level 516 may have a higher degree of priority than third level 518, and third level 518 may have a higher degree of priority than fourth level 520. First level 514 may manage communications between excavating fleet members 508, hauling fleet members 510, utility fleet members 512, or other branches of communication network 106 (not shown). For example, a message received from one of hauling fleet members 510 and destined for one of excavating fleet members 508 may first be received and processed by offboard system 202. Off-board system 202 may then forward the message to excavating fleet members 508. A message transmitted by off-board system 202 and destined for a particular fleet member may originate at first level 514, and may sequentially propagate through subsequent levels 516-520 to reach its destination.

In FIG. 5, off-board system 202 in first level 514 is the supervisor of machines 522-530 in second level 516. Machine 526 in second level 516 is the supervisor of machines 532-540 in third level 518. Machine 534 in third level 518 is the supervisor of machines 542-546 in fourth level 520. Accordingly, it is to be appreciated that communication network 106 may have a regimented or tiered priority configuration independent of the fleet members' geographical location in environment 100.

Figure 6:
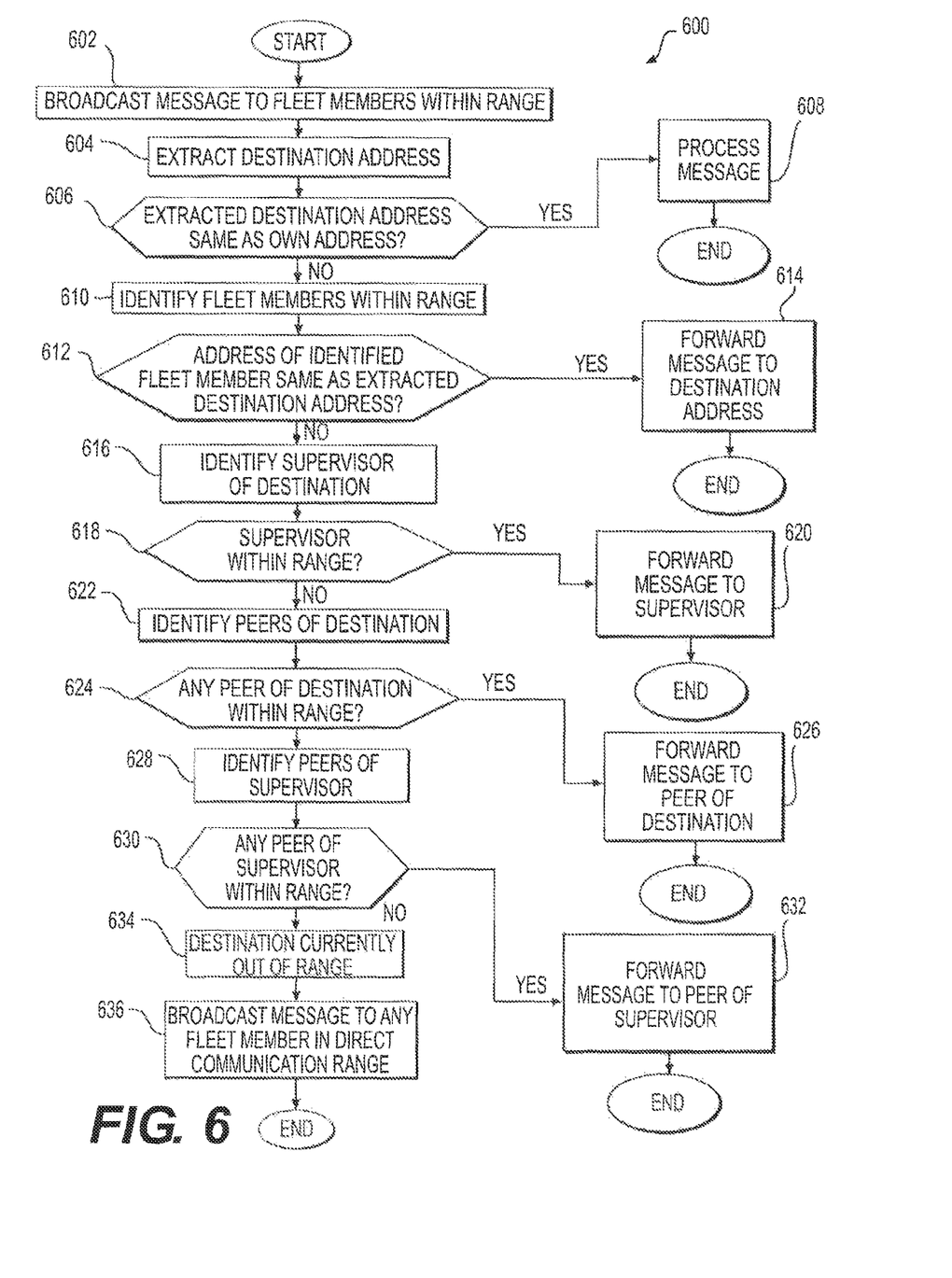
FIG. 6 is a flowchart describing an exemplary disclosed message forwarding process performed by a fleet member of FIG. 1.
Figure 7:
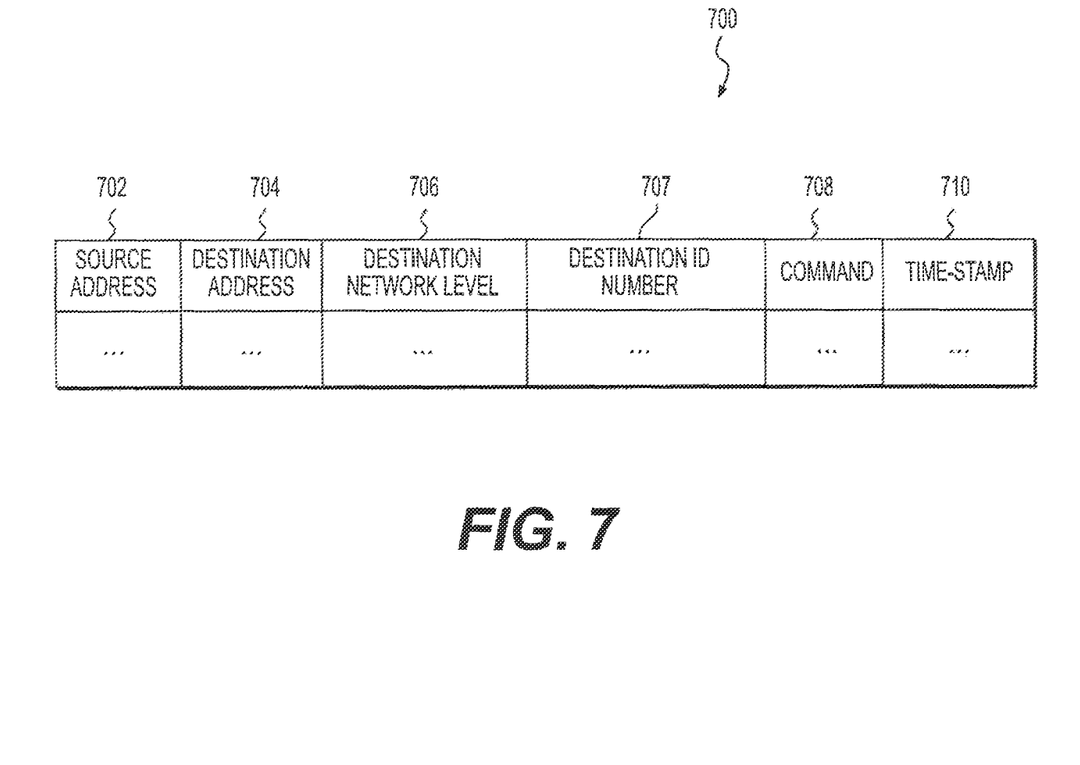
FIG. 7 is a representation of an exemplary message transmitted on the communication network of FIG. 5.

FIG. 6 illustrates an exemplary disclosed communication process 600 for communication network 106. As discussed above, offboard system 202 may need to communicate with a particular fleet member in certain situations. For example, dispatch system 500 may need to send a message to recall a particular fleet member for scheduled maintenance. FIG. 7 shows an exemplary configuration of a message 700 transmitted on communication network 106. Message 700 may be a packet containing a source address 702, a destination address 704, a destination network level 706, a destination identification number 707, a command 708, and a time-stamp 710.

Source address 702 may be an address on communication network 106 address (e.g., IP address) of the source node (e.g., off-board system 202). Destination address 704 may be an address on communication network 106 (e.g., an IP address) of the destination node (e.g., a fleet member). Destination network level 706 may indicate the level of communication network 106 to which the destination node is assigned (e.g., level 4). Destination identification number 707 may include a number of the destination node within the network level to which it is assigned (e.g., machine 3). Command 708 may contain, for example, an instruction or other information to be processed by the destination node. Timestamp 710 may indicate the time at which message 700 was generated or transmitted by off-board system 202.

Returning to FIG. 6, off-board system 202 may broadcast message 700 to any fleet members within direct communication range (step 602). For example, excavation fleet server 502, haul fleet server 504, or utility fleet server 506 may broadcast message 700 via radio, and any fleet members within direct radio communication range may receive message 700. It is noted that the broadcast may be an open broadcast, or may be a transmission only to select fleet members on certain channels (e.g., to particular IP addresses).

Any fleet member that receives message 700 may extract destination address 704 (step 604). The fleet member may then determine whether the extracted destination address is the same as its own address (step 606). For example, gateway 216 onboard the fleet member may compare the extracted destination address to network address 410 contained in machine information table 410 (FIG. 4).

If the fleet member determines in step 606 that the extracted destination address is the same as its own address, the fleet member may process message 700 (step 608). For example, gateway 216 may extract command 708. Protocol conversion module 304 may determine to which of onboard modules 204-214 command 708 is to be sent, and generate an onboard message containing command 708 and formatted appropriately for communication on bus 218. Onboard communication module 300 may then transmit the onboard message on bus 218 via a data link port 308 associated with the onboard module. The onboard module may then extract the command and execute the message. Continuing with the recall message example above, the onboard message may be transmitted on a data link port 308 associated with navigation control module 214. Navigation control module 214 may then extract and execute the command. For example, in the case of autonomous control, navigation control module 214 may reroute machine 104 to a maintenance facility indicated in the command. In the case of semi-autonomous or manual control, navigation control module 214 may display a message instructing the machine operator to bring machine 104 to the maintenance facility.

If the fleet member determines in step 606 that the extracted destination address is not the same as its own address, the fleet member may identify any fleet members within direct communication range of itself (step 610). Specifically, network communication module 306 may identify in machine information table 400 its own network address 410. Network communication module 306 may then look up its network address 410 in column 422 of network information table 402, and may identify any corresponding fleet members (i.e., network levels and identification numbers) listed in column 420. Network communication module 306 may then look up in columns 412 and 414 the network levels and machine identification numbers, respectively, of the identified fleet members within direct communication range, and may identify and extract their corresponding network addresses listed in column 422.

Next, the fleet member may determine whether the network address of any fleet member identified in step 610 is the same as the extracted destination address 704 (step 612). That is, the fleet member may determine whether the destination of message 700 is within direct radio communication range. Specifically, network communication module 306 may compare the network address of any fleet member identified in step 610 to the extracted destination address 704 and determine, based on the comparison, whether the network address of any fleet member identified in step 610 is the same as the extracted destination address 704. If so, the fleet member may forward message 700 to destination address 704 (step 614). Specifically, off-board communication module 302 may forward message 700 to destination address 704 via open radio broadcast or via an off-board data link port 310 associated with the extracted destination address.

If it is determined in step 612 that the address of any fleet member identified in step 610 is not the same as destination address 704, the fleet member may identify the supervisor of the destination (step 616). Specifically, network communication module 306 may look up destination address 704 in column 422, and may identify the corresponding supervisor's network level and identification number listed in columns 416 and 417, respectively. Alternatively, network communication module 306 may extract from message 700 destination network level 706 (e.g., level 3) and destination identification number 707 (e.g., machine 4). Network communication module 306 may then look up the extracted destination network level 706 and destination identification number 707 in columns 412 and 414, respectively. Network communication module 306 may then identify the corresponding supervisor level network level and supervisor identification number listed in columns 416 and 417, respectively.

The fleet member may then determine whether the supervisor of the destination identified in step 616 is within direct communication range (step 618). Specifically, network communication module 306 may look up the fleet member's own address 410 in column 422, and may determine whether the supervisor network level and supervisor identification number identified in step 616 are listed in column 420 for that address. Alternatively, network communication module 306 may look up the fleet member's own network level 404 and machine identification number 406 network level in columns 412 and 414, respectively, and may determine whether the supervisor level and supervisor identification number identified in step 616 are listed in column 420. If the supervisor level and supervisor identification number are listed in column 420, network communication module 306 may determine that the supervisor of the destination is within direct communication range. If it is determined in step 618 that the supervisor of the destination is within direct communication range, the fleet member may forward message 700 to the supervisor (step 620) as discussed above.

If it is determined in step 618 that the supervisor of the destination is not within direct communication range, the fleet member may identify any peers of the destination (step 622). That is, the fleet member may identify any other fleet members in the same network level (e.g., level 3) as the destination. Specifically, network communication module 306 may look up extracted destination network level 706 in column 412 (i.e., network communication module 306 may look up all "level 3" fleet members), and may identify all corresponding machine identification numbers (e.g., machines 1-5) listed in column 414.

The fleet member may next determine whether any peer of the destination identified in step 622 is within direct communication range (step 624). Specifically, network communication module 306 may look up the fleet member's own network address 410 in column 422, and may determine whether any peer identified in step 622 is listed in column 420 for the address. Alternatively, network communication module 306 may look up the fleet member's own network level 404 and machine identification number 406 in columns 412 and 414, respectively, and may determine whether a corresponding peer is listed in column 420. If so, network communication module 306 may determine that the peer of the destination is within direct communication range. If it is determined in step 624 that a peer of the destination is within direct communication range, the fleet member may forward message 700 to that peer (step 626), as discussed above.

If it is determined in step 624 that no peer is within direct communication range, the fleet member may identify any peer of the supervisor of the destination (step 628). That is, the fleet member may identify any fleet members in the same level (e.g., level 2) as the supervisor of the destination. Specifically, network communication module 306 may look up the network level of the supervisor of the destination identified in step 616 in column 412 (e.g., all level 2 fleet members), and may identify all corresponding machine identification numbers listed in column 414.

The fleet member may next determine whether any peer of the destination's supervisor identified in step 628 is within direct communication range (step 630). Specifically, network communication module 306 determine whether any peer of the destination's supervisor is listed in column 420. If so, the network communication module 306 may determine that the peer of the supervisor of the destination is within direct communication range, and may forward message 700 to that peer of the supervisor of the destination (step 632) as discussed above.

If it is determined in step 630 that a peer of the destination's supervisor is not within direct communication range of the fleet member, the fleet member may determine that the destination is currently out of range (step 634). In addition, the fleet member may broadcast message 700 to any fleet member currently within direct communication range (step 636). Specifically, network communication module 306 may look up the fleet member's own network address 410 in column 422, and may identify the network level and machine identification number of any corresponding fleet members listed in column 420. Network communication module 306 may then look up the network levels and machine identification numbers of the identified fleet members within direct communication range in columns 412 and 414, respectively, and may identify their corresponding network addresses listed in column 422. Off-board communication module 302 may then forward message 700 to the network addresses as discussed above.

The fleet members to which message 700 is forwarded in step 636 may store message 700 in a mailbox associated with the destination until the destination is within communication range. For example, the fleet members may perform steps 604-636 discussed above until message 700 is delivered to the destination.

It is to be appreciated that a supervisor fleet member may, for one reason or another, go offline and therefore be unable to communicate. For example, a supervisor fleet member may travel outside of communication range of the rest of fleet 102. Alternatively, the supervisor fleet member may malfunction technically. In such cases, the supervisees of that supervisor may be "cut-off" from communication network 106. For example, referring to FIG. 5, if machine 534 goes off-line, its supervisees, machines 542, 544, and 546, may be cut-off from communication network 106.

Figure 8:
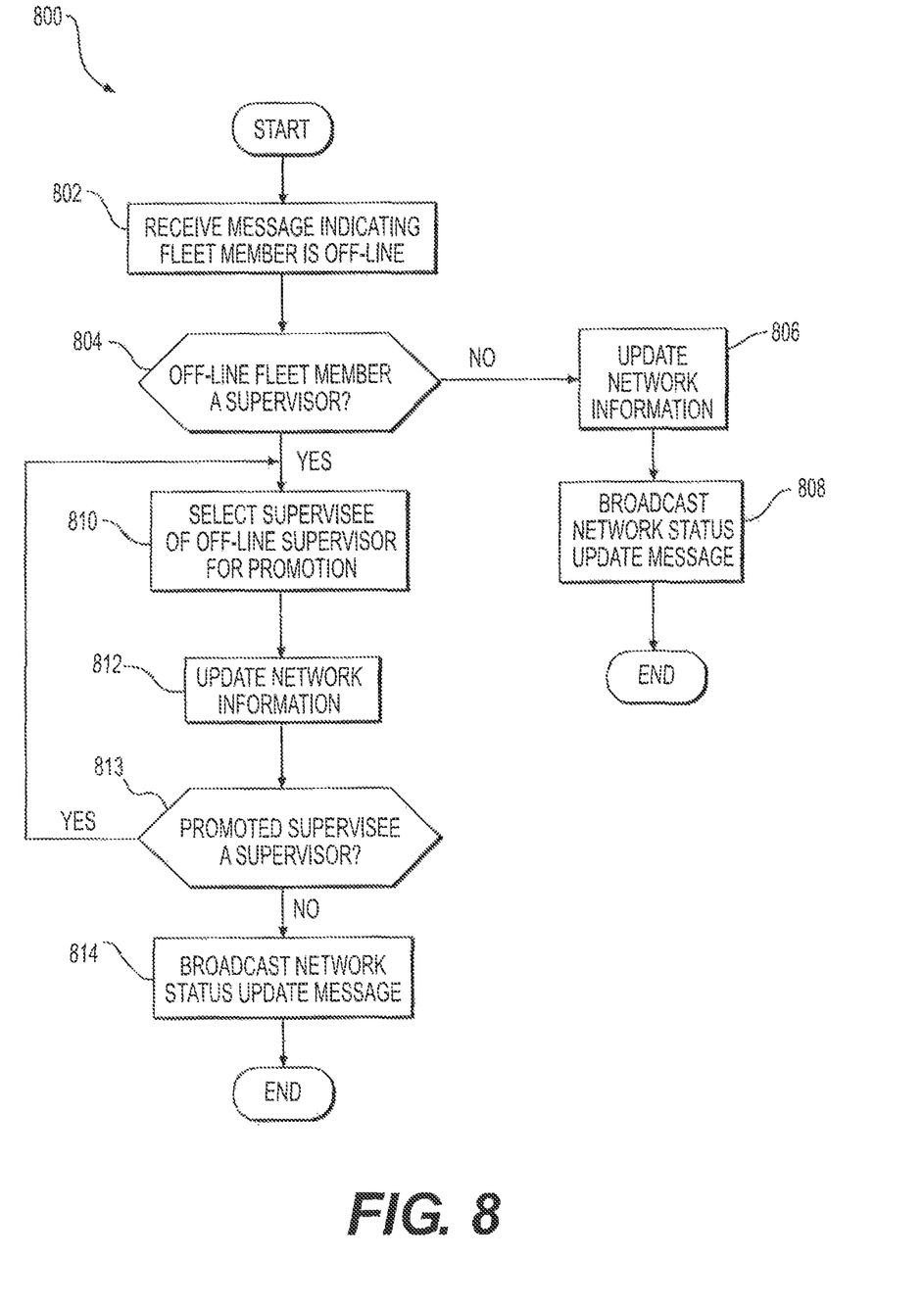
FIG. 8 is a flowchart describing an exemplary disclosed process performed by an off-board system for promoting a fleet member.

FIG. 8 shows an exemplary disclosed "promotion" process 800 that may be performed by off-board system 202 to rectify communication network 106 when such an event occurs. As discussed above, off-board system 202 may receive a message from fleet 102 indicating that a fleet member is off-line (step 802). The message may contain, for example, the network level and machine identification number of the off-line fleet member. Off-board system 202 may then analyze the message to determine whether the off-line fleet member is a supervisor (step 804) (i.e., whether it has any supervisees). For example, off-board system 202 may extract the network level and the number within the network from the message, and look up the off-line fleet member in network information database 505 (FIG. 5) to determine whether the off-line fleet member has any supervisee fleet members.

If it is determined in step 804 that the off-line fleet member is not a supervisor, off-board system 202 may update network information database 505 to indicate that the off-line fleet member is no longer available (step 806), and may broadcast a network status update message (step 808). For example, referring to FIG. 5, if machine 546 has technical difficulties and therefore goes off-line, off-board system 202 may determine that the off-line fleet member is not a supervisor (i.e., it has no supervisees), and may update network information database 505 to reflect that machine 546 is no longer available. For example, off-board system 202 may delete an associated entry for machine 546 in network information database 505. Off-board system 202 may then broadcast a message to fleet 102 indicating that machine 546 is no longer available. The fleet members may also update their own network information tables 402 to indicate that machine 546 is no longer available.

However, if off-board system 202 determines in step 804 that the off-line fleet member is a supervisor (i.e., it has supervisees), it may select one of the supervisees of the off-line supervisor for promotion (step 810). For example, referring to FIG. 5, if machine 534 goes off-line, off-board system 202 may access network information database 505 to identify its supervisees (i.e., machines 542-546). Off-board system 202 may then select one of the supervisees (e.g., machine 542) for promotion to supervisor. That is, off-board system 202 may select one of the supervisees to take the place of the supervisor (i.e., machine 534) in communication network 106. This selection may be based on various factors, such as the machine types of the supervisees (e.g., haul truck, excavator, etc.), the functions performed by the supervisees, the current status of the supervisees, the geographical location of the supervisees (e.g., the locations of the supervisees in environment 100 and the surround terrain), available bandwidth on network 106, etc. The promoted supervisee may have the remaining supervisees of the off-line fleet member (i.e., machines 544 and 546) as supervisees.

Off-board system 202 may then update network information database 505 to reflect the promotion (step 812). Specifically, off-board system 202 may update the promoted fleet member's network level and machine identification number stored in network information database 505 with that of the off-line fleet member. This may be accomplished by incrementing the promoted fleet member's network level by one (e.g., from level 3 to level 2) and by replacing the promoted fleet member's current machine identification number with that of the off-line fleet member. Off-board system 202 may also update network information database 505 to indicate that the off-line fleet member is no longer available for communication, as discussed above.

Upon completion of step 812, off-board system 202 may determine whether the promoted supervisee is also a supervisor (step 813). That is, off-board system 202 may look up look up the promoted supervisee fleet member's network level and machine identification number in network information database 505 (FIG. 5) to determine whether it has any supervisee fleet members. For example, referring to FIG. 5, supervisee machine 534 may be selected in step 810 for promotion, but may also have its own supervisee machines 542-546. If it is determined in step 813 that the supervisee selected for promotion in step 810 is also a supervisor, off-board system 202 may return to step 810 to select one of the promoted supervisee's supervisees for promotion. That is, off-board system 202 may repeat step 810 with respect to the promoted supervisee. For example, if supervisee machine 534 has been selected for promotion, off-board system may select one of supervisee machines 542-546 for promotion (i.e., to take the promoted supervisee's position in communication network 106). Off-board system 202 may then repeat step 812 to update network information database 505 with respect to the promoted supervisee's supervisees. Accordingly, off-board system 202 may repeat the promotion process of steps 810-813, working its way through network levels 518-520, until no supervisors remain to be promoted, or until a supervisee which is not also a supervisor is promoted.

Once it is determined in step 813 that the promoted supervisee is not also a supervisor, off-board system 202 may broadcast a network status update message to fleet (step 814). The network status update message may indicate that the off-line fleet member is no longer available for communication. The network status message may also contain information about the promotion(s). The fleet members may then update their respective network information tables 402 to reflect the promotion(s) and to indicate that the off-line fleet member is no longer available. For example, the fleet members may update the promoted fleet member's network level and machine identification number stored in network information network information table 402 with that of the off-line fleet member, as described above. The fleet members may similarly update the network level and machine identification number of any subsequent fleet member promoted in steps 810-813. Accordingly, during future communication on communication network 106, the promoted supervisee may act as a substitute supervisor for the off-line fleet member. Likewise, any subsequent promoted supervisee may act as a substitute for the supervisor for which it was promoted to replace.

It is noted that the assignment of addresses of the fleet members on communication network 106, and the layout of communication network 106 may be predetermined. For example, a network administrator may determine which fleet members are to be supervisors and supervisees, and network information databases 312, 505 may be preconfigured with this information. Accordingly, the fleet members may each have a static IP address and a predetermined network level and machine identification number on communication network 106 (e.g., level 3, machine 3). Off-board system 202 may alternatively allocate dynamic addresses to fleet members based on the available bandwidth on communication network 106. It is to be appreciated, however, that any other suitable methods for assigning addresses on a network may be utilized.

INDUSTRIAL APPLICABILITY

The disclosed fleet communication network may be applicable to any communication network where a reliable architecture would be advantageous. By routing messages between sources and destinations according to various tiers of priority on the network when a destination is not within direct communication range, as disclosed, traffic on the network can be organized in a structurally reliable manner and network resources (e.g., bandwidth) can be conserved. In addition, the basic architecture of the network may remain intact irrespective of the geographical positions of the fleet members. Thus, the disclosed fleet communication network may be particularly useful in situations where the reliability of communications is an issue, such as in a network of an autonomous fleet of machines cooperating to accomplish a task.

Other embodiments of the disclosed methods and systems will be apparent to those skilled in the art upon consideration of the specification and practice of the disclosure. It is intended that the specification be considered exemplary only, with a true scope of the disclosure being indicated by the following claims and their equivalents.

What is claimed is:

1. A communication network for a fleet of vehicles, comprising:
    a plurality of fleet members including at least a supervisor and a supervisee; and
    an off-board system configured to transmit messages to, and receive messages from, the plurality of fleet members;
    wherein the fleet members are configured to;
        receive a message destined for the supervisee;
        determine whether the supervisee is within direct communication range; and
        send the message to the supervisee in response to determining that the supervisee is within direct communication range;
        in response to determining that the supervisee is not in direct communication range:
            determine whether the supervisor is in direct communication range; and
            send the message to the supervisor if it is determined that the supervisor is in direct communication range; and
        in response to determining that the supervisor is not in direct communication range:
            identify another fleet member that is within direct communication range; and
            send the message to the another fleet member.

2. The communication network of claim 1, wherein each fleet member includes a network communication module.

3. The communication network of claim 2, wherein the network communication module is in communication with a network information database.

4. The communication network of claim 3, wherein the fleet members are configured to determine whether the supervisee is within direct communication range or whether the supervisor is within direct communication range by looking up information in the network information database.

5. The communication network of claim 3, wherein each fleet member is further configured to periodically broadcast a beacon.

6. The communication network of claim 3, wherein, in response to receiving a beacon, a fleet member is configured to update their network information database with information indicating a broadcasting fleet member is currently within direct communication range.

7. The communication network of claim 3, wherein, in response to receiving a beacon, a fleet member is configured to communicate to the off-board system that a broadcasting fleet member is currently within direct communication range.

8. The communication network of claim 1, wherein the off-board system is configured to broadcast a network status update message.

9. The communication network of claim 8, wherein, in response to receiving a network status update message from the off-board controller, each fleet member is configured to update a network information table.

10. A communication method for a network of a fleet of vehicles, comprising:
    assigning at least a supervisor and a supervisee of a plurality of fleet members;
    receiving, at a fleet member, a message destined for the supervisee;
    determining, at the fleet member, whether the supervisee is within direct communication range;
    forwarding the message to the supervisee in response to determining that the supervisee is within direct communication range;
    in response to determining that the supervisee is not within direct communication range:
        determining whether the supervisor is in direct communication range; and
        sending the message to the supervisor in response to determining that the supervisor is within direct communication range; and
    in response to determining that the supervisor is not within direct communication range:
        identifying another fleet member that is within direct communication range; and
        sending the message to the another fleet member that is within direct communication range.

11. The communication method of claim 10, wherein each fleet member includes a network communication module.

12. The communication method of claim 11, wherein the network communication module is in communication with a network information database.

13. The communication method of claim 12, wherein determining whether the supervisee is within direct communication range is performed by looking up information in the network information database.

14. The communication method of claim 10, further including:
    broadcasting a beacon.

15. The communication method of claim 10, further including:
    receiving a beacon indicating that a broadcasting fleet member is currently within direct communication range; and
    communicating to an off-board system that the broadcasting fleet member is currently within direct communication range.

16. The communication method of claim 10, further including:
    receiving a beacon indicating that a broadcasting fleet member is currently within direct communication range; and
    updating a network information database with information indicating the broadcasting fleet member is currently within direct communication range.

17. The communication method of claim 10, further including:
    broadcasting a network status update message.

18. The communication method of claim 17, further including:
    updating a network information table.

19. A non-transitory computer-readable storage medium having stored thereon a program that when executed by a processor causes a computer to perform the following:
    receive a message destined for a supervisee;
    determine whether the supervisee is within direct communication range;
    forward the message to the supervisee in response to determining that the supervisee is within direct communication range;

in response to determining that the supervisee is not within direct communication range:
   determine whether the supervisor is in direct communication range; and
   send the message to the supervisor in response to determining that the supervisor is within direct communication range; and
in response to determining that the supervisor is not within direct communication range:
   identify another fleet member that is within direct communication range; and
   send the message to the another fleet member that is within direct communication range.

20. The non-transitory computer-readable storage medium of claim 9, wherein determining whether the supervisee is within direct communication range is performed by looking up information in the network information database.

* * * * *